United States Patent
Scott

(10) Patent No.: US 11,314,597 B2
(45) Date of Patent: *Apr. 26, 2022

(54) SYSTEM AND METHOD FOR MAINTAINING A DISTRIBUTED AND FAULT-TOLERANT STATE OVER AN INFORMATION CENTRIC NETWORK

(71) Applicant: Cisco Technology, Inc., San Jose, CA (US)

(72) Inventor: Glenn C. Scott, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 780 days.

This patent is subject to a terminal disclaimer.

(21) Appl. No.: 16/227,473

(22) Filed: Dec. 20, 2018

(65) Prior Publication Data

US 2019/0121703 A1    Apr. 25, 2019

Related U.S. Application Data

(63) Continuation of application No. 14/476,264, filed on Sep. 3, 2014, now Pat. No. 10,204,013.

(51) Int. Cl.
*G06F 16/20* (2019.01)
*G06F 9/46* (2006.01)
(Continued)

(52) U.S. Cl.
CPC ............ *G06F 11/1446* (2013.01); *G06F 9/46* (2013.01); *G06F 11/14* (2013.01); *G06F 16/21* (2019.01);
(Continued)

(58) Field of Classification Search
CPC ...................................................... G06F 16/21
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 101420360 A | 4/2009 |
|---|---|---|
| CN | 101510209 A | 8/2009 |

(Continued)

OTHER PUBLICATIONS

Office Action in counterpart Chinese Patent Application No. 201510519270.8, dated Sep. 5, 2019, 12 pages.

(Continued)

*Primary Examiner* — Kristopher Andersen

(57) ABSTRACT

A replica management system facilitates maintaining a distributed and fault-tolerant state for a variable over an Information Centric Network (ICN) by replicating the variable across a set of ICN nodes. During operation, a variable-hosting ICN node can receive an Interest that includes a value-updating command for a replica instance of the variable, current values for a set of replicas of the variable, and a new value for the variable. The ICN node can determine, based on the current values for the set of replica variables, whether the current value for the local replica variable is an authoritative value. If so, the ICN node updates the local replica variable to the new value. However, if the current local value is not the authoritative value, the ICN node rolls back a state of the local replica variable to a previous state, and updates the local replica variable to the new value.

20 Claims, 8 Drawing Sheets

(51) Int. Cl.
  *G06F 11/14*   (2006.01)
  *G06F 16/21*   (2019.01)
  *H04L 45/28*   (2022.01)
  *G06F 11/10*   (2006.01)
  *H04L 67/1095*   (2022.01)
  *H04L 67/63*   (2022.01)

(52) U.S. Cl.
  CPC .......... *H04L 45/28* (2013.01); *H04L 67/1095* (2013.01); *H04L 67/327* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |

(56) References Cited

U.S. PATENT DOCUMENTS

| | | |
|---|---|---|
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Rat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011398 A1 | 1/2012 | Eckhardt et al. |
| 2012/0011551 A1 | 1/2012 | Levy |
| 2012/0036180 A1 | 2/2012 | Thornton et al. |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |

(56) References Cited

U.S. PATENT DOCUMENTS

| | | |
|---|---|---|
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110781 A1 | 5/2013 | Golab et al. |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2016/0062840 A1 | 3/2016 | Scott |

FOREIGN PATENT DOCUMENTS

| | | |
|---|---|---|
| DE | 1720277 A1 | 6/1967 |
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.eom/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

(56) References Cited

OTHER PUBLICATIONS

Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
Nadeem Javaid, "Analysis and design of quality link metrics for routing protocols in Wireless Networks", PhD Thesis Defense, Dec. 15, 2010, Universete Paris-Est.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart Yemote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", Feb. 14, 2005, retrieved from https://crypto.stanford.edu/~dabo/papers/broadcast.pdf, 19 pages.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", Aug. 8, 2011, retrieved from http://people.cs.vt.edu/danfeng/papers/securecomm2011-cloud.pdf, 10 pages.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
Google, "ccnx-trace", https://code.google.eom/archive/p/ccnx-trace/, Jul. 23, 2012, 2 pages.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.

(56) References Cited

OTHER PUBLICATIONS

J. Bethencourt, A, Sahai, and B. Waters, 'Ciphertext-policy attributebased encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevolume 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE-A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online], Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/documents/Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

(56) References Cited

OTHER PUBLICATIONS

Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions On Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Networks.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/ www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Extended European Search Report and Written Opinion in counterpart European Application No. 15181881.2, dated Jan. 27, 2017, 7 pages.
Rodrig, et al., "Decentralized Weighted Voting for P2P Data Managment," Proceedings of the 3rd ACM international workshop on Data engineering for wireless and mobile access, MobiDe '03, Sep. 2003, 9 pages.
Xie, et al., "Enhancing Cache Robustness for Content-Centric Networking," 2012 Proceesings IEEE INFOCOM, Mar. 2012, 9 pages.

SYSTEM AND METHOD FOR MAINTAINING A DISTRIBUTED AND FAULT-TOLERANT STATE OVER AN INFORMATION CENTRIC NETWORK

CROSS-REFERENCE TO RELATED APPLICATIONS

This application is a continuation of U.S. patent application Ser. No. 14/476,264, filed Sep. 3, 2014, the entirety of which is incorporated herein by reference.

BACKGROUND

Field

This disclosure is generally related to Information Centric Networking. More specifically, this disclosure is related replicating a variable over an Information Centric Network (ICN) and maintaining a distributed and fault-tolerant state for the variable.

Related Art

In an information centric network (ICN), a client device can obtain data by disseminating a request or Interest message that includes a name for this data. Intermediate routers in ICN propagate this Interest toward any content producer associated with the Interest's name prefix. The content producer that receives the Interest can generate and return a Content Object that satisfies the Interest (e.g., the name of the Content Object exactly matches the name in the Interest packet). The routers then forward the Content Object to the client device along the reverse path traversed by the Interest message, leveraging reverse-path information left in the routers by the Interest message.

ICN architectures are designed to allow a client to obtain data efficiently and securely without regard to where the data comes from. However, a typical ICN network typically returns one Content Object to satisfy one Interest. If an ICN node that hosts the data fails or becomes compromised, other ICN nodes that consume the data are at risk of using outdated (cached) information or malicious values.

SUMMARY

One embodiment provides a replica management system that facilitates maintaining a distributed and fault-tolerant state for a variable over an Information Centric Network (ICN) by replicating a variable across a set of ICN nodes. During operation, a variable-hosting ICN node can receive an Interest that includes a value-updating command for a variable, current values for a set of replicas of the variable, and a new value for the variable. The ICN node can determine, based on the current values for the set of replica variables, whether the current local value for the variable is an authoritative value. If the current local value is the authoritative value, the ICN node can update a local replica of the variable to the new value. However, if the current local value is not the authoritative value, the ICN node can roll back a state of the local replica of the variable to a previous state, and updates the local replica of the variable to the new value.

In information centric networks (ICN), each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data networks (NDN) or content-centric networks (CCN) are examples of an ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual namecomponents pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and DianaK. Smetters, filed 18 Dec. 2008), which is hereby incorporated by reference.

In some embodiments, while determining whether the current local value for the variable is an authoritative value, the ICN node determines whether an authoritative value exists, and determining whether the current local value matches the authoritative value.

In some variations on these embodiments, while determining whether an authoritative value exists, the ICN node determines, based on the current values for the set of replica variables, a largest set of matching values, and determines whether the number of matching values in the largest set is greater than or equal to a minimum quorum threshold.

In some variations on these embodiments, if the ICN node determines that an authoritative value does not exist, the ICN node can roll back a state of the local replica of the variable to a previous state.

In some embodiments, the Interest comprises the value-updating command appended to the Interest's name.

In some embodiments, the Interest comprises a payload that includes the value-updating command.

One embodiment provides a client ICN node that can read and update a distributed variable that is replicated across a set of ICN nodes. During operation, a client ICN node can read a distributed variable's value by disseminating at least one Interest for reading a set of replicas of the variable. A respective Interest can include a value-reading command for reading a corresponding replica of the variable, and a name that includes a mutable name prefix associated with a replica variable and any replica server that hosts the replica variable. After disseminating the at least one Interest, the ICN node can receive a set of Content Objects that satisfy the at least one Interest, such that a respective Content Object can include a current value for a respective replica variable. The ICN node can then determine whether an authoritative value exists for the variable based on the current values in the set of Content Objects. If an authoritative value does not exist, the ICN node can roll back a state for a local copy of the variable to a previous state.

In some embodiments, the ICN node can roll back the state of the local copy of the variable without informing a replica server of the non-authoritative values across the replica variables.

In some embodiments, responsive to determining that an authoritative value does exist, the ICN node can set the local copy of the variable to the authoritative value.

In some embodiments, while determining whether an authoritative value exists, the ICN node determines, from the set of Content Objects that satisfy the Interest, a largest set of similar values for the variable. The ICN node then determines whether the number of similar values in the largest set is greater than or equal to a minimum quorum threshold. If so, the value from this largest set of similar values is used as the authoritative value.

In some embodiments, the ICN node can update the set of replicas of the variable. In doing so, the ICN node selects at least a subset of replica variables to update. The ICN node then generates an Interest comprising a value-updating command for a respective replica variable in the subset of replica variables, the current values received for the set of replica variables, and a new value for the variable, and disseminates the Interest for the respective replica variable.

In some embodiments, the number of replica variables in the selected subset of replica variables is greater than or equal to a minimum quorum threshold.

In some variations on these embodiments, the Interest for the respective replica variable includes a name comprising the routable name prefix associated with the variable, followed by a name component associated with the respective replica of the variable.

BRIEF DESCRIPTION OF THE FIGURES

In the figures, like reference numerals refer to the same figure elements

DETAILED DESCRIPTION

Figure 1:
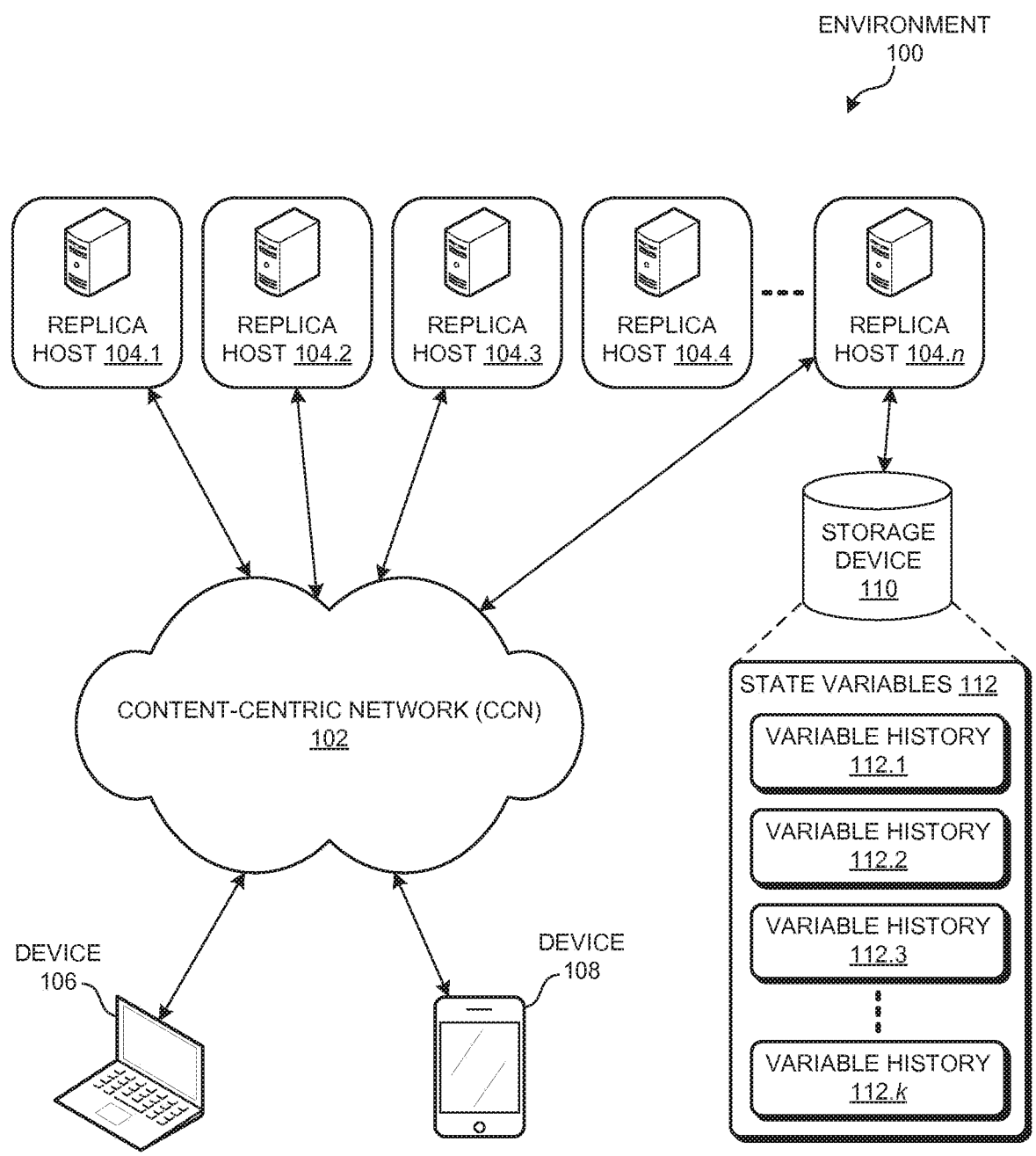
FIG. 1 illustrates an exemplary computing environment that facilitates managing data replicated across a plurality of replica servers in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a replica management system that solves the problem of maintaining a distributed and fault-tolerant state for a variable over an Information Centric Network (ICN) by replicating a variable across a set of ICN nodes. Other ICN nodes can access the variable by disseminating an Interest for each replica of the variable, which they can obtain from any ICN nodes that host the replica variables. The ICN nodes that host or consume the replica variables can independently verify the integrity of the variable's state by determining whether an acceptable or unacceptable number of inconsistencies exist across the set of replica variables.

For example, a set of distributed ICN nodes may together host N replicas of a variable for which there is no authoritative entity that controls a master copy of the variable. Each replica of the variable maintains current and historical states (values) for the local instance of the variable, which are together referred to as a Variable History. The full collection of N replicas of the variable is referred to as a Variable History Set (VHS). The responsibility of hosting the VHS can be safely distributed across the set of distributed ICN nodes, such that an authoritative value exists for a variable when at least a majority of its replicas have a matching value. This largest set of matching replicas that produces an authoritative value is hereinafter referred to as a quorum, Q, and has a size |Q|. Also, when a client updates the variable, the client needs to successfully update at least |Q| replica variables to maintain the integrity of the variable.

A Variable History can include a current state (e.g., current values for a collection of variables), as well has historical states that can be used to roll back an erroneous state to a previous good state. Also, a variable can generally store any piece of information, and can be realized using a Content Object or any other data structure now known or later developed. For example, a variable can include a system state comprising a multitude of data elements (e.g., a collection of variables) that together represent the system's state. This way, the system's state can be replicated using a VHS to safeguard the state information against tampering and failover events.

An ICN node that hosts a Variable History can obtain the current values of the VHS, or a subset of the VHS, from a client device that issues an update to the VHS. The ICN node can analyze the current values to determine whether |Q| replica variables have a matching value, and if so, uses this value as the authoritative value. If the local replica variable does not match this authoritative value, the ICN node can update its replica variable to store the authoritative value.

On the other hand, if an authoritative value does not exist, the ICN node may use the local Variable History to migrate the local replica variable to a previous good state (e.g., a previous authoritative state). Also, it's possible for the ICN node to use the current values to repair the local replica variable's state. For example, if the largest set of matching values is just large enough to provide a repair value, the ICN node may use this repair value to repair the broken state without having to migrate to a previous state.

In some embodiments, a system administrator can configure the size of the VHS, and the required number of matching replica variables to produce an authoritative value or a repair value. For example, the total number of state replicas, N, that need to host the state information to guarantee fault tolerance and security can depend on a maximum expected number of replicas, !, that may be offline during an operation, and a maximum number of replicas, b, that may be maintained at a malicious ICN node or may not be up to date. In some embodiments, the total number of replicas for the state information needs to be:

$$N=3f+2b+1 \quad (1)$$

Also, to be able to determine an authoritative value, the number of minimum number of replicas with matching values needs to be the minimum quorum size:

$$|Q|=2f+2b+1 \quad (2)$$

If the minimum quorum size, |Q| is not met, then the set of replicas for the state information do not provide an authoritative value. However, it is possible for a system administrator or a fault-correction service to repair the replica variable at an ICN node if the largest number of replica variables with matching values is at least:

$$|R|=f+b+1 \quad (3)$$

This number of replica variables |R| needs to be large enough to disambiguate the authoritative value from erroneous or malicious values in the set.

Exemplary Variable-Replication Environment

FIG. 1 illustrates an exemplary computing environment 100 that facilitates managing data replicated across a plurality of replica servers in accordance with an embodiment. Specifically, ICN 102 can include a number of devices, such as replica hosts 104, client devices 106 and 108, and any other type of ICN node that can forward requests (e.g., Interests) and named data objects (e.g., Content Objects) across ICN 102. Devices 104, 106, and 108 can be any type of a computing device, including a mobile computing device, such as a laptop computer, a tablet or slate computer, a smartphone, or a personal digital assistant (PDA), or a stationary computing device, such as a server computer or desktop computer. In addition, each device may include various resources for forwarding the requests and/or returning the matching named data objects, such as a pending Interest table (PIT), a forwarding information base (FIB), a Content Store (CS).

Replica hosts $104.1\text{-}104.n$ can each host one or more Variable Histories, such that a complete VHS is distributed across replica hosts 104. Each variable history stores a current replica value for the VHS variable, as well as a set of historical replica values for the VHS variable. For example, replica host $104.n$ can include a storage device 110 that stores a plurality of variable histories $112.1\text{-}112.k$ In some embodiments, variable histories $112.1\text{-}112.k$ can correspond to multiple replicas of one variable (e.g., they can correspond to one VHS), or can correspond to replicas of multiple different variables that together make up a state set (e.g., they can correspond to multiple VHSs).

Devices 106 and 108 can correspond to client devices that query replica hosts 104 to obtain replica values from at least |Q| of replica hosts $104.1\text{-}104.n$, and decide for themselves whether the variable's state needs to be rolled back. For example, devices 106 and 108 can also store a Variable History for the authoritative values of the VHS. If device 106 queries replica hosts 104 and receives |Q| matching replica values, device 106 can use this matching value as the authoritative value for the VHS. On the other hand, if device 106 determines that an authoritative value does not exist across the VHS (which is distributed across replica hosts 104), device 106 can roll back the variable's state to a previous state that stores a known authoritative value, and device 106 does not need to inform any of replica hosts 104 of the broken VHS state. In some embodiments, it is the client device that generates a new value for the variable that inform replica hosts 104 of the broken VHS state (e.g., to fix the broken state). Device 106 can safely use the previous state as the authoritative value, given that replica hosts 104 will each roll back to this same previous state at a future time when a client intends to update the variable's value.

For example, a newspaper company "Gotham Gazette" may use a collection of Content Objects with name prefix "/GothamGazette" to store their newspaper content that is to be accessed by their consumers, as well as to host their statistics on their subscriptions. The content collection with name prefix "/GothamGazette" may include a VHS of n replicas, distributed across replica hosts 104, and so each variable (Content Object) in the collection also has n replicas distributed across replica hosts 104. A replica host $104.i$ that hosts a replica of the collection advertises the name prefix for each variable in the collection, appended by a unique identifier associated with the replica being hosted:

$$/\{name\_prefix\_for\_variable\}/\{replica\ identifier\} \quad (4)$$

Note that an Interest for "/{name_prefix_for_variable}" can return a value from any replica of the variable, such as from any of replica hosts 104. However, an Interest for "/{name_prefix_for_variable}/{replica identifier}" can return a value only from a replica variable associated with the unique identifier {replica identifier}.

The unique identifier may be a numeric or logical value that identifies the replica variable, or may include a logical identifier associated with replica host 104.i. This causes network nodes across ICN 102 to forward any request or Interest that includes the name for this given replica to network node 104.i. For example, client 106 or 108 can access a replica with identifier "3" of a variable "/GothamGazette/subscriber_size" by disseminating an Interest for "/GothamGazette/subscriber_size/3." If replica host 104.3 is associated with a replica identifier "3," the network nodes across ICN 102 will forward this request or Interest to replica host 104.3.

Hence, the replica variable associated with the ID "3" and replica server 104.3 is accessible via the same name: "/{name_prefix_for_variable}/3." However, the replica variable can still move around replica hosts 104, or even to a different network device in ICN 102, such as to migrate the replica to a new host or to move the replica to a new network location. As the replica variable moves to a new host, this new host can advertise the presence of the replica variable to allow ICN 102 to forward all new requests to this host.

Figure 2:
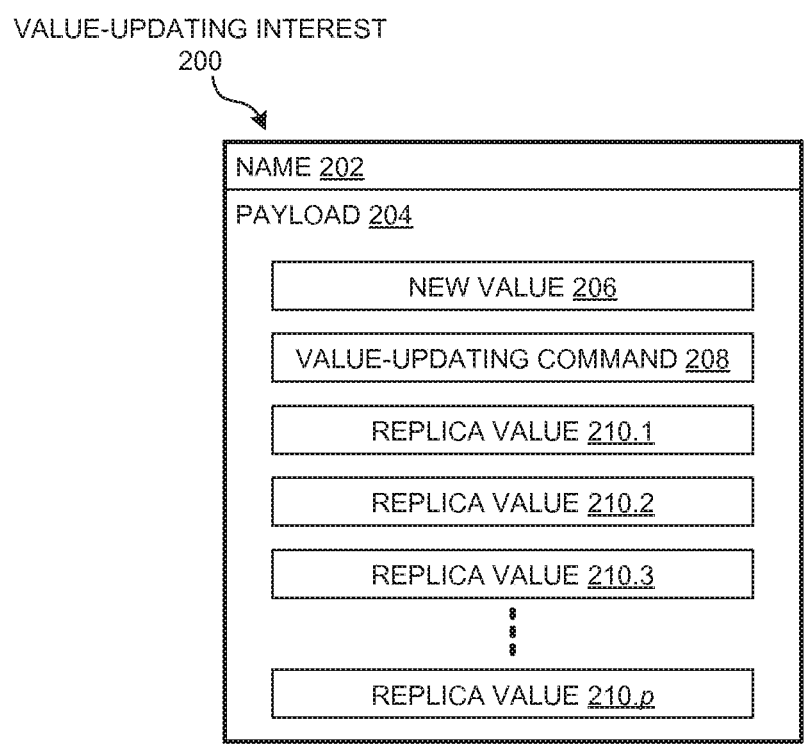
FIG. 2 illustrates an exemplary Interest message for updating a variable's value at a replica server in accordance with an embodiment.

FIG. 2 illustrates an exemplary Interest message 200 for updating a replica variable in accordance with an embodiment. Interest message 200 includes a name 202 and a payload 204. Name 202 is associated with a replica variable that is to be updated. Payload 204 can include a new value 206 for the variable, and includes a value-updating command 208 which causes a replica host to update the replica variable to new value 206. Payload can also include current replica values 210 for at least a subset of replicas across the VHS, which the replica host can use to determine whether its local value for the variable is the authoritative value.

Replica Server

Figure 3:
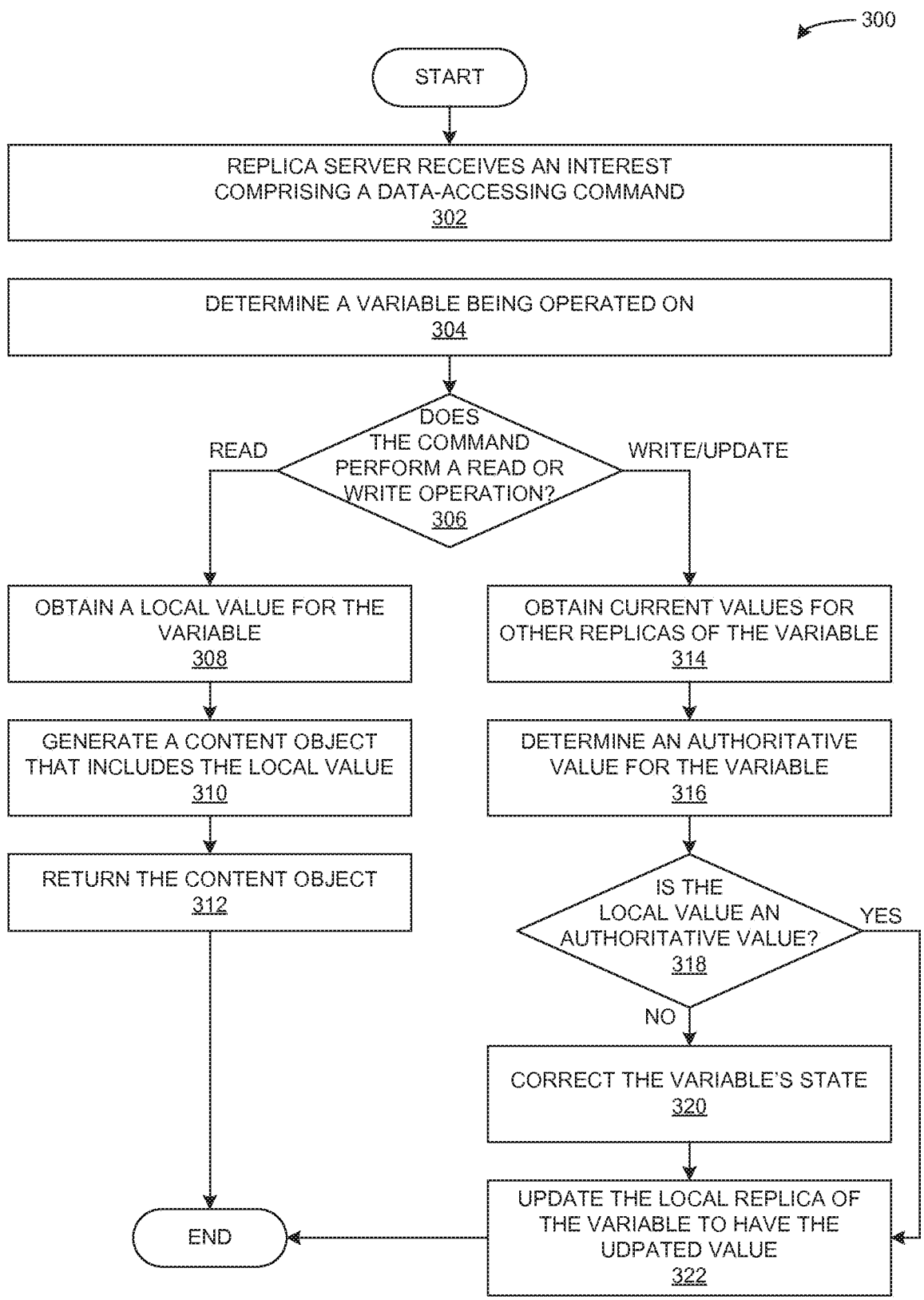
FIG. 3 presents a flow chart illustrating a method for processing a data-accessing command at a replica server in accordance with an embodiment.

FIG. 3 presents a flow chart illustrating a method 300 for processing a data-accessing command at a replica server in accordance with an embodiment. During operation, the replica server can receive an Interest that includes a data-accessing command (operation 302), and analyzes the command from the Interest to determine which variable is to be operated on (operation 304).

The replica server then determines whether the command performs a read operation or a value-updating operation (operation 306). If the command is a read operation, the replica server obtains a local value for this variable (operation 308), and generates a Content Object with a name that includes the Interest's name and a payload that includes the local value for the variable (operation 310). The replica server then returns the Content Object to satisfy the Interest (operation 312).

However, if the command is a value-updating command, the replica server analyzes the Interest to obtain current values for other replica variables (e.g., for the variable from other replica servers) (operation 314). The replica server then determines an authoritative value for the variable (operation 316), and determines whether the local value is an authoritative value (operation 318). If the local value is the authoritative value, the replica server can proceed to update the local variable to have the updated value (operation 322).

On the other hand, if the local value is not an authoritative value, the replica server has detected an issue either locally or among the collection of replica servers. For example, the local replica's state may be inconsistent with that of other replicas, or possibly a client was not able to update data at enough replicas to reach a new authoritative state. In either case, the local replica server proceeds to roll back the replica variable's state to a previous state (operation 320), and then updates the local replica of the variable to have the updated value specified in the Interest (operation 322).

In some embodiments, the local replica server can correct the variable's state by rolling back the replica variable's state to a last known good state, and in some variations, may even roll back the server's state (e.g., a state comprising a collection of replica variables) to a last known good state.

In some other embodiments, if enough replica variables have matching values (e.g., at least |R| variables in the VHS have matching values), the local replica server can correct the variable's state by using this matching value to restore the VHS's authoritative value. For example, one or more replica servers and/or their administrator(s) can update a corresponding replica variable to store this restore value, if the replica variable doesn't hold this value already.

Figure 4:
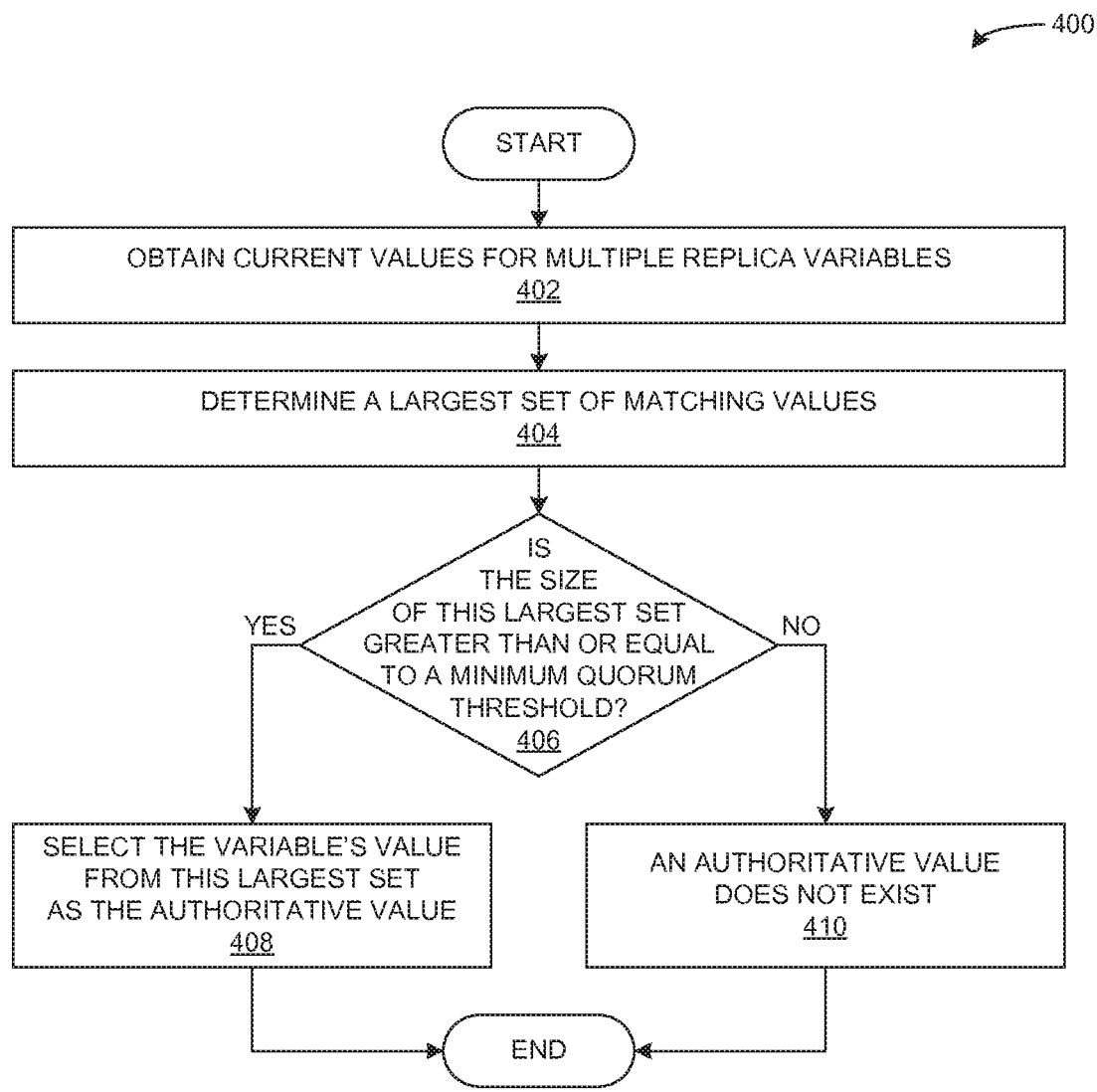
FIG. 4 presents a flow chart illustrating a method for determining an authoritative value in accordance with an embodiment.

FIG. 4 presents a flow chart illustrating a method 400 for detecting an authoritative value in a VHS in accordance with an embodiment. During operation, a network node (e.g., a replica server or a client device) can obtain current values for multiple replicas of the variable (e.g., for the variable across a set of replica servers) (operation 402). For example, a client may obtain these current values by disseminating an Interest that reads each instance of the variable across the set of replica servers. A replica server, on the other hand, can obtain these current values from an Interest that performs a value-updating operation on the variable.

Recall that not all of these current values may be the same. A replica server may have an outdated value if a client updated the variable's value at the other replica servers without updating the local replica server, or if a malicious entity managed to change the variable's value to an erroneous value. The server or client then determine a largest set of matching values among the set (operation 404), and determines whether the size of this largest set is greater than or equal to a minimum quorum threshold, |Q| (operation 406). If so, the device determines that an authoritative value exists, and selects the variable's value from this set as the authoritative value (operation 408). On the other hand, if the size is less than the quorum threshold, the device determines that an authoritative value does not exist (operation 410).

Client Device

Figure 5:
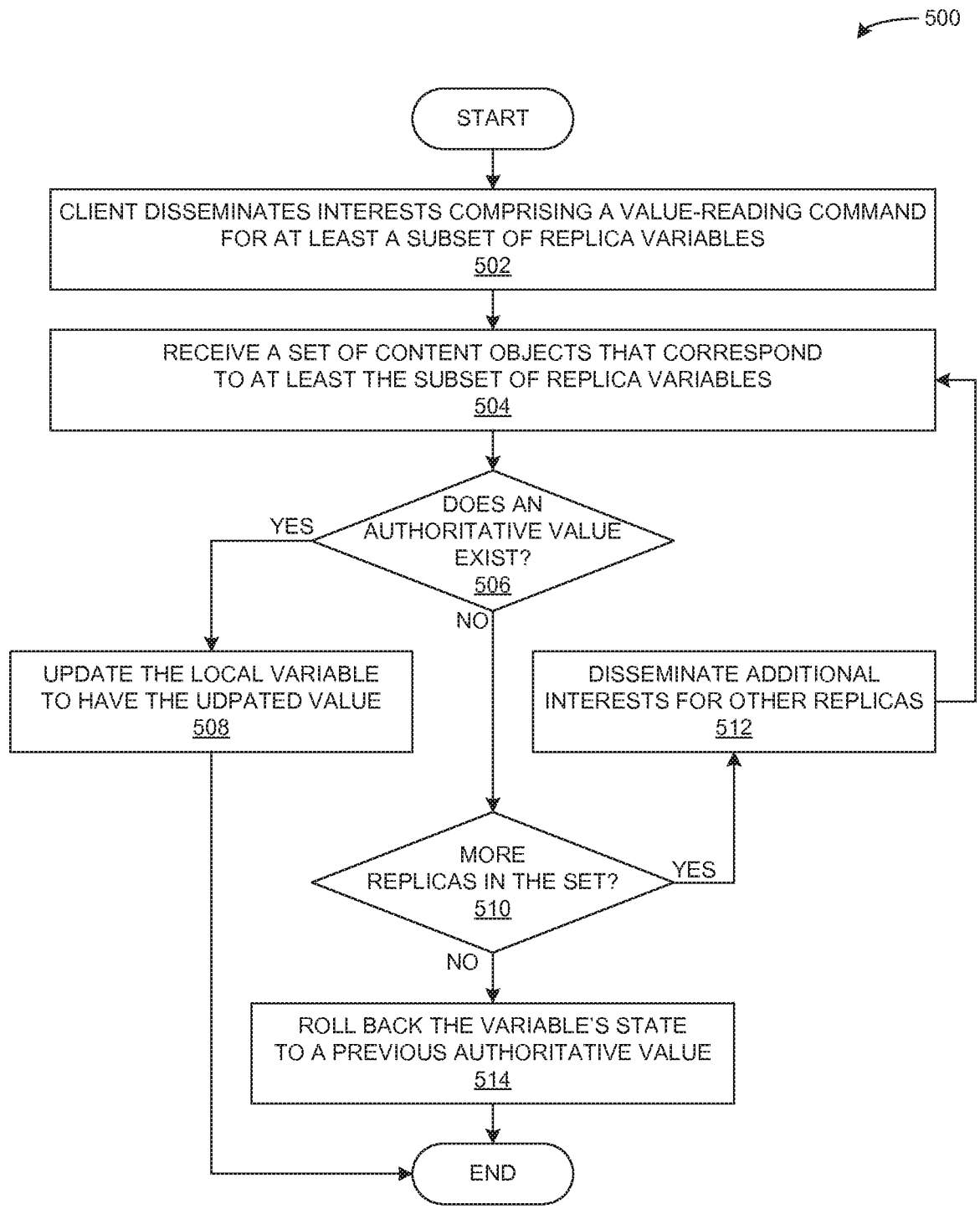
FIG. 5 presents a flow chart illustrating a method for reading a variable's value from a set of replica servers in accordance with an embodiment.

FIG. 5 presents a flow chart illustrating a method 500 for reading a variable that is replicated over a set of replica servers in accordance with an embodiment. During operation, the client can disseminate Interests for at least a subset of a variable's replicas (operation 502), such that each Interest includes a request for a different replica of the variable. The client receives a set of Content Objects that correspond to the subset of replica variables (operation 504), which the client analyzes to determine whether an authoritative value exists (operation 506). If an authoritative value exists, the client updates the local variable to the updated value (operation 508).

In some embodiments, the subset of replica variables being read needs to be at least equal to the minimum quorum threshold, |Q|, to be able to detect an authoritative value from |Q| matching values. If the client does not detect an authoritative value from this subset of replica variables, the client can disseminate additional Interests for other replica variables until either an authoritative value is detected, or there are no more replica variables in the VHS to query. For example, the client can determine whether additional replicas exist in the VHS (operation 510). If so, the client disseminates additional Interests for the other replicas (operation 512), and returns to operation 504 to receive and process the replica values it receives for these other replicas. On the other hand, if no more replicas exist in the VHS, the client rolls back the variable's value to a previous state (operation 514).

Figure 6:
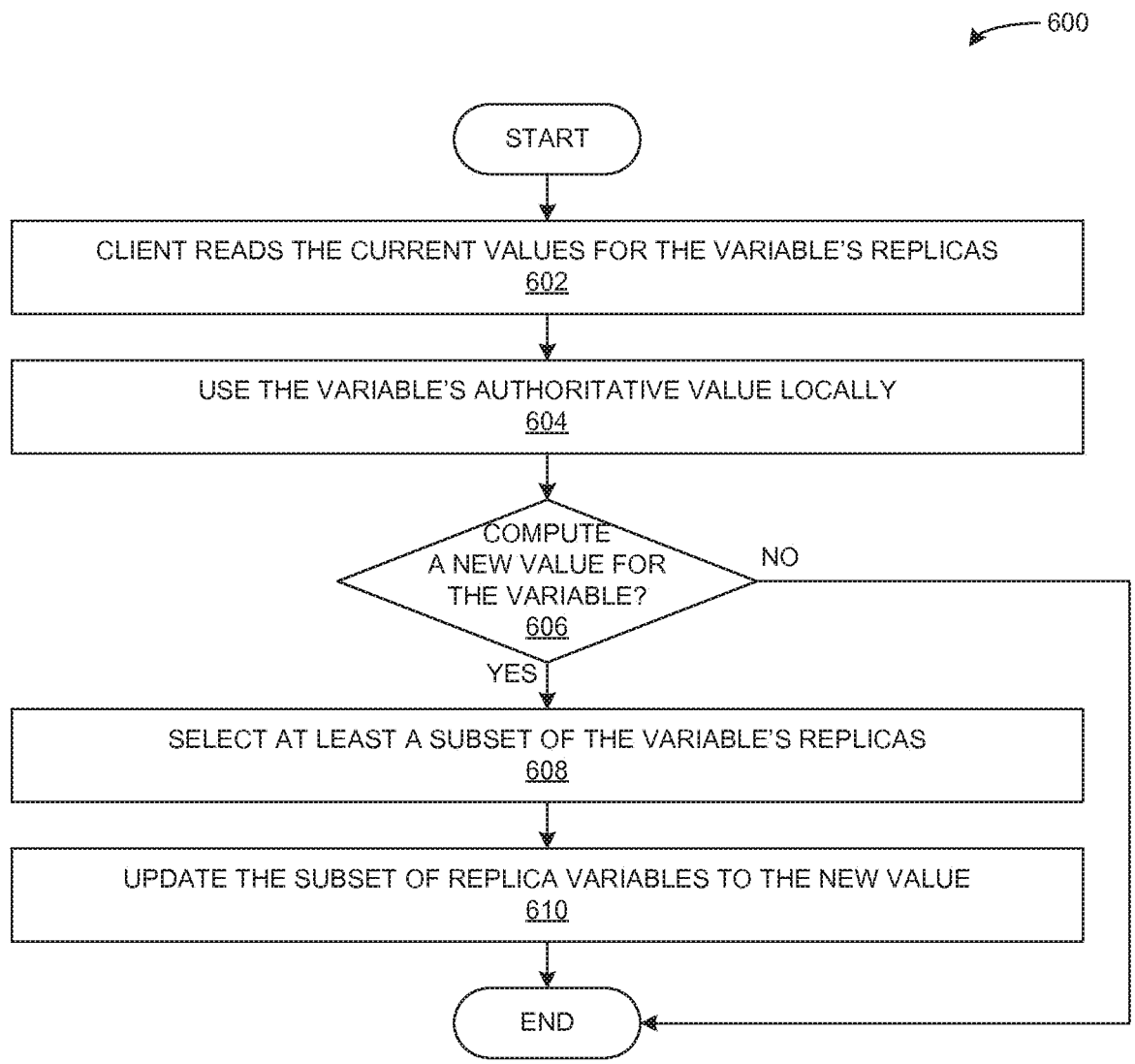
FIG. 6 presents a flow chart illustrating a method for updating a variable's value across a set of replica servers in accordance with an embodiment.

FIG. 6 presents a flow chart illustrating a method 600 for updating a variable's value across a set of replica servers in accordance with an embodiment. During operation, the client reads the current values for the variable's replicas (operation 602), such as by disseminating Interests for at least a subset of a variable's replicas. The client can use the variable's authoritative value locally (operation 604), such as to present data to a user, to generate other new data, or even to update the variable's value.

If the client does update the variable's value (operation 606), the client selects at least a subset of the variable's replicas to update (operation 608), and updates this subset of replica variables to hold the new value (operation 610). The size of this subset needs to be at least equal to the minimum quorum threshold, |Q|.

In some embodiments, the client can update the replica variables using a push protocol or a pull protocol. For example, the client can push the new value by generating an Interest comprising a value-updating command for the selected replica variables, and disseminates the Interests over the ICN. These Interests include the current values for the replica variables in the VHS, and also include the new value for the variable. The current variable values and the new value can be included as part of the value-updating command, or can be included as separate data elements in the Interest. Also, the Interest can include the value-updating command and the current and updated values in the Interest's name (e.g., in a marshalled object), or within a payload segment of the Interest that is separate from the Interest's name.

As another example, in a pull protocol, each replica host can disseminate an Interest that queries the client for an updated value. If the client does generate a new value, the client can return a Content Object for each Interest it receives from a replica host for the variable. This Content Object can include the current values for the replica variables in the VHS, along with the new value for the variable.

Figure 7:
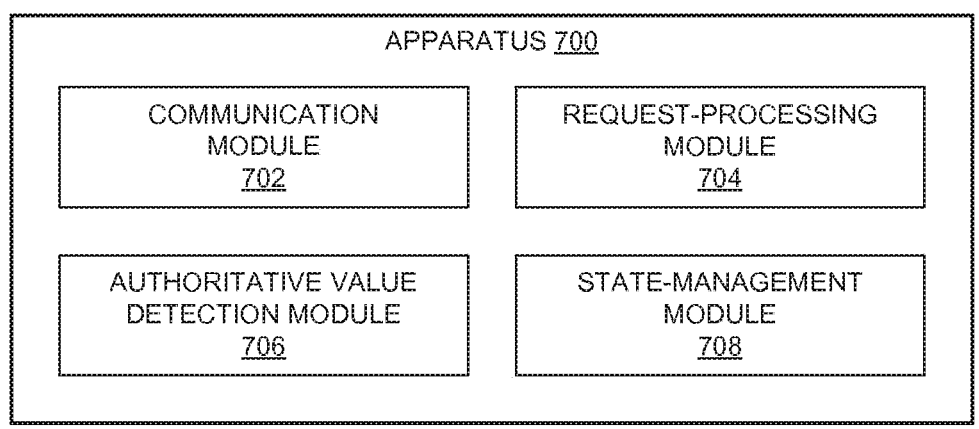
FIG. 7 illustrates an exemplary apparatus that facilitates managing data replicated across a plurality of replica servers in accordance with an embodiment.

FIG. 7 illustrates an exemplary apparatus 700 that facilitates managing data replicated across a plurality of replica servers in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a request-processing module 704, an authoritative value detection module 706, and a state-management module 708.

In some embodiments, communication module 702 can send and/or receive Interests for accessing a replica of a distributed variable. Request-processing module 704 can process a variable-accessing Interest to return a Content Object that includes a current value for the variable's replica, or can process a variable-updating Interest that includes a new value for the variable. Authoritative value detection module 706 can process values from a set of replica variables to determine whether an authoritative value exists. State-management module 708 can roll back the variable's state to a previous state if the local replica variable's value does not match the authoritative value or if an authoritative value does not exist, and can update the local variable's value to include the new value if the local value matches the authoritative value.

Figure 8:
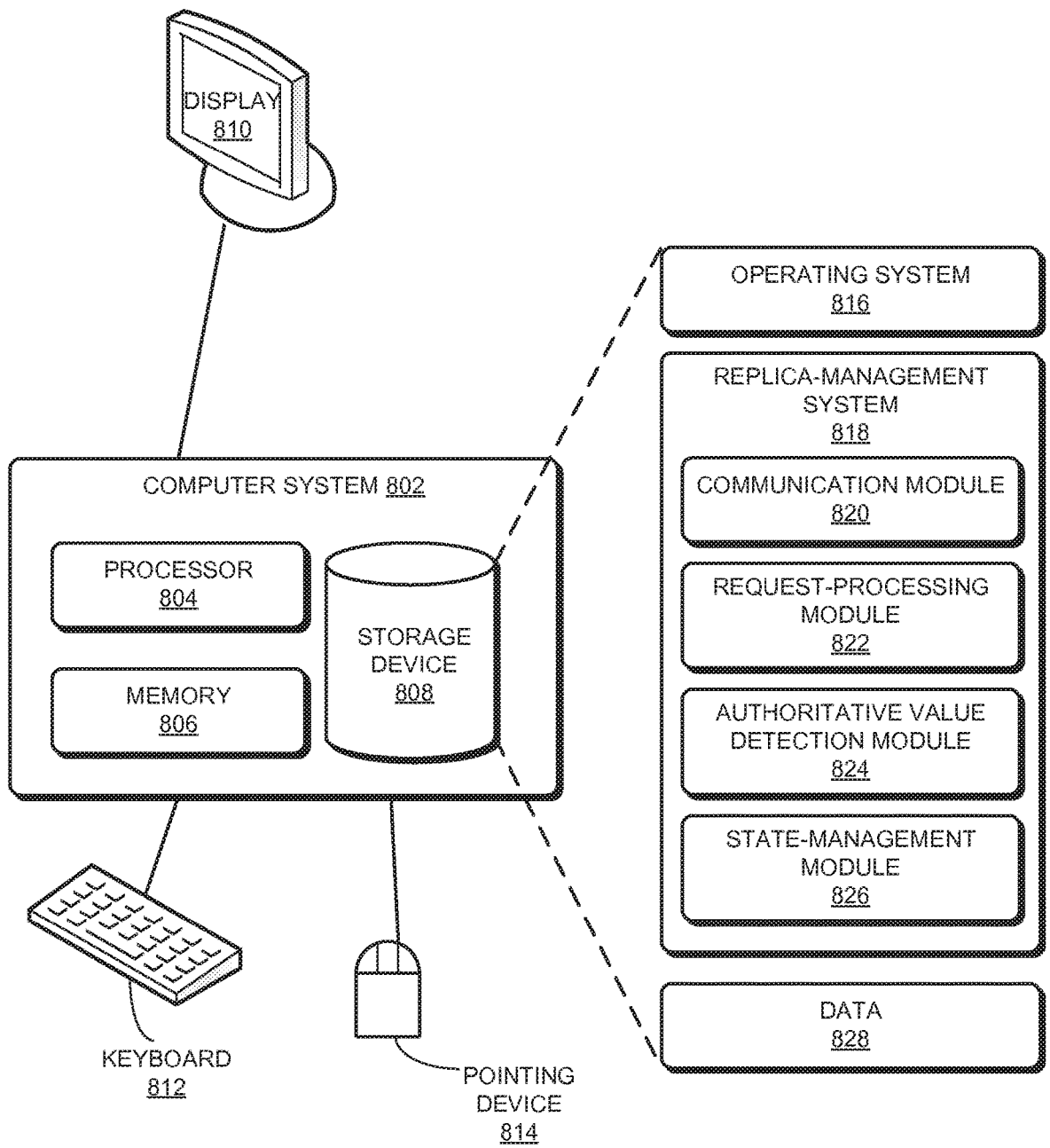
FIG. 8 illustrates an exemplary computer system that facilitates managing data replicated across a plurality of replica servers in accordance with an embodiment.

FIG. 8 illustrates an exemplary computer system 802 that facilitates managing data replicated across a plurality of replica servers in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, replica management system 818, and data 828.

Replica management system 818 can include instructions, which when executed by computer system 802, can cause computer system 802 to perform methods and/or processes described in this disclosure. Specifically, replica management system 818 may include instructions for sending and/or receiving Interests for accessing a replica of a distributed variable (communication module 820). Further, replica management system 818 can include instructions for processing a variable-accessing Interest to return a Content Object that includes a current value for the variable's replica, and for processing a variable-updating Interest that includes a new value for the variable (request-processing module 822).

Replica management system 818 can also include instructions for processing values from a set of replica variables to determine whether an authoritative value exists (authoritative value detection module 824). Further, replica management system 818 can include instructions for rolling back the variable's state to a previous state if the local replica variable's value does not match the authoritative value or if an authoritative value does not exist, and for updating the local variable's value to include the new value if the local value matches the authoritative value state-management module 826).

Data 828 can include any data that is required as input or that is generated as output by the methods and/or processes described in this disclosure. Specifically, data 828 can store at least variable histories for a local instance of a variable, and/or recent and/or historical variable values from a plurality of replica instances of the variable.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
receiving, by a replica server in an information centric network, an Interest comprising a value-updating command for a variable, current values for a set of replica variables of the variable, and a new value for the variable;
determining an authoritative value based on the current values for the set of replica variables;
determining whether a current local value for the variable stored by the replica server is the authoritative value; and
responsive to determining that the current local value is the authoritative value, updating a local replica of the variable to the new value.

2. The method of claim 1, further comprising:
responsive to determining that the current local value is not the authoritative value, rolling back a state of the local replica of the variable to a previous state; and
updating the local replica of the variable to the new value.

3. The method of claim 1, wherein determining whether the current local value for the variable is an authoritative value includes:
determining whether an authoritative value exists based on the current values for the set of replica variables; and
determining whether the current local value matches the authoritative value.

4. The method of claim 3, wherein determining whether an authoritative value exists includes:
determining, based on the current values for the set of replica variables, a largest set of matching values; and
determining whether a number of matching values in the largest set is greater than or equal to a minimum quorum threshold.

5. The method of claim 3, further comprising:
responsive to determining that an authoritative value does not exist, rolling back a state of the local replica of the variable to a previous state.

6. The method of claim 1, wherein the Interest comprises the value-updating command appended to a name of the Interest.

7. The method of claim 1, wherein the Interest comprises a payload that includes the value-updating command.

8. A non-transitory computer-readable storage medium storing instructions that when executed by a processor cause the processor to:
receive, in an information centric network, an Interest comprising a value-updating command for a variable, current values for a set of replica variables of the variable, and a new value for the variable;
determine an authoritative value based on the current values for the set of replica variables;
determine whether a current local value for the variable is the authoritative value; and
responsive to determining that the current local value is the authoritative value, update a local replica of the variable to the new value.

9. The non-transitory computer-readable storage medium of claim 8, wherein the instructions cause the processor to:
responsive to determining that the current local value is not the authoritative value, roll back a state of the local replica of the variable to a previous state; and
update the local replica of the variable to the new value.

10. The non-transitory computer-readable storage medium of claim 8, wherein the instructions cause the processor to determine whether the current local value for the variable is an authoritative value by:
determining whether an authoritative value exists based on the current values for the set of replica variables; and
determining whether the current local value matches the authoritative value.

11. The non-transitory computer-readable storage medium of claim 10, wherein the instructions cause the processor to determine whether an authoritative value exists by:
determining, based on the current values for the set of replica variables, a largest set of matching values; and
determining whether a number of matching values in the largest set is greater than or equal to a minimum quorum threshold.

12. The non-transitory computer-readable storage medium of claim 10, wherein the instructions cause the processor to:
responsive to determining that an authoritative value does not exist, roll back a state of the local replica of the variable to a previous state.

13. The non-transitory computer-readable storage medium of claim 8, wherein the Interest comprises the value-updating command appended to a name of the Interest.

14. The non-transitory computer-readable storage medium of claim 8, wherein the Interest comprises a payload that includes the value-updating command.

15. An apparatus comprising:
a communication interface configured to enable network communications;
a processor; and
a storage device for storing instructions, wherein the processor is configured to execute the instructions to:
receive, in an information centric network, an Interest comprising a value-updating command for a variable, current values for a set of replica variables of the variable, and a new value for the variable;
determine an authoritative value based on the current values for the set of replica variables;
determine whether a current local value for the variable is the authoritative value; and
responsive to determining that the current local value is the authoritative value, update a local replica of the variable to the new value.

16. The apparatus of claim 15, wherein the processor is configured to execute the instructions to:
responsive to determining that the current local value is not the authoritative value, roll back a state of the local replica of the variable to a previous state; and
update the local replica of the variable to the new value.

17. The apparatus of claim 15, wherein the processor is configured to execute the instructions to determine whether the current local value for the variable is an authoritative value by:
   determining whether an authoritative value exists based on the current values for the set of replica variables; and
   determining whether the current local value matches the authoritative value.

18. The apparatus of claim 17, wherein the processor is configured to execute the instructions to determine whether an authoritative value exists by:
   determining, based on the current values for the set of replica variables, a largest set of matching values; and
   determining whether a number of matching values in the largest set is greater than or equal to a minimum quorum threshold.

19. The apparatus of claim 15, wherein the Interest comprises the value-updating command appended to a name of the Interest.

20. The apparatus of claim 15, wherein the Interest comprises a payload that includes the value-updating command.

* * * * *